(12) United States Patent
Krishnan (10) Patent No.: US 8,631,221 B2
(45) Date of Patent: Jan. 14, 2014

(54) METHOD AND APPARATUS FOR ALLOCATING HOST MEMORY FOR A MEMORY-LESS ADD-ON DEVICES

(75) Inventor: Vetrivelan Krishnan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1187 days.

(21) Appl. No.: 12/036,077

(22) Filed: Feb. 22, 2008

(65) Prior Publication Data
US 2009/0216987 A1  Aug. 27, 2009

(51) Int. Cl.
*G06F 12/02* (2006.01)

(52) U.S. Cl.
USPC ............ 711/170; 711/115; 711/E12.002; 713/2

(58) Field of Classification Search
None
See application file for complete search history.

(56) References Cited

U.S. PATENT DOCUMENTS

| | | | | |
|---|---|---|---|---|
| 5,532,945 A | * | 7/1996 | Robinson | 711/115 |
| 5,835,760 A | * | 11/1998 | Harmer | 713/2 |
| 6,393,492 B1 | * | 5/2002 | Cornaby et al. | 713/2 |
| 2004/0039892 A1 | * | 2/2004 | Goldschmidt | 711/170 |
| 2007/0204127 A1 | * | 8/2007 | Lin et al. | 711/170 |

OTHER PUBLICATIONS

Boleyn, Erich, "INT 15h, AX+E820h—Query system Address Map," Jan. 2007, http://www.uruk.org/orig-grub/mem64mb.html.*

* cited by examiner

*Primary Examiner* — Michael Krofcheck
(74) *Attorney, Agent, or Firm* — P. Su (57) ABSTRACT

Methods and apparatus for allocating host memory for use by a host channel adapter (HCA) with insufficient on-board memory are disclosed. In one embodiment, a method includes determining when a host memory arrangement which has a host memory updates a system address map associated with the host memory, and obtaining control from a system basic-input-output-system (BIOS) associated with an operating system (OS) of the host memory arrangement when the system address map is updated. The method also includes allocating a first memory block in the host memory using an add-on device after obtaining control from the host memory arrangement. The system address map is updated by the add-on device to indicate that the first memory block has been allocated to the add-on device. Finally, the method includes returning the control to the system BIOS after updating the system address map.

17 Claims, 6 Drawing Sheets

METHOD AND APPARATUS FOR ALLOCATING HOST MEMORY FOR A MEMORY-LESS ADD-ON DEVICES

BACKGROUND OF THE INVENTION

The present invention relates generally to supporting add-on devices associated with a computing system.

Add-on devices, or computer optional hardware modules, typically enhance the capabilities of computing system. In other words, incorporating add-on devices into a computing system improves the functionality and/or the performance of the computing system. Many add-on devices require system resources of the computing system, such as those associated with a direct memory access (DMA) feature, an interrupt request (IRQ) feature, an input/output (I/O) feature, a memory mapped I/O (MMIO) feature, and the like. A system basic-input-output-system (BIOS) running on a computing system when an add-on device is incorporated or plugged into the computing system generally manages the system resources during a power on self test (POST), and is substantially responsible for allocating the system resources to the add-on device.

Many add-on devices utilize memory, as for example to execute code and to store data. The memory used by such add-on devices may either be memory "on-board" the add-on devices, or system memory associated with a computing system into which the add-on device has been incorporated.

BRIEF DESCRIPTION OF THE DRAWINGS

The invention will be readily understood by the following detailed description in conjunction with the accompanying drawings, wherein like reference numerals designate like structural elements, and in which.

DESCRIPTION OF EXAMPLE EMBODIMENTS

General Overview

In one embodiment, a method includes determining when a host memory arrangement which has a host memory updates, e.g., initializes, a system address map associated with the host memory, and obtaining control from a system basic-input-output-system (BIOS) associated with an operating system (OS) of the host memory arrangement when the system address map is updated. The method also includes allocating a first memory block in the host memory using an add-on device after obtaining control from the host memory arrangement. The system address map is updated by the add-on device to indicate that the first memory block has been allocated to the add-on device. Finally, the method includes returning the control to the system BIOS after updating the system address map.

Description

Allowing an add-on device, as for example a host bus adapter (HBA), incorporated into a computing system to allocate system memory of the computing system enables the system memory to be allocated efficiently. When such an add-on device modifies a system memory map, or a table that indicates how a system memory has been allocated, to indicate that memory has been allocated to the add-on device, applications associated with the computing system may be made aware that portions of memory have been allocated to the add-on device. By way of example, if an operating system (OS) associated with the computing system accesses the system memory map, the OS becomes aware that the add-on device is using a portion of the system memory and, hence, is unlikely to overwrite that portion of the system memory.

The ability for an add-on device to allocate system memory for its use, rather than carry sufficient memory "on-board" to support the memory requirements of the add-on device, reduces the cost of the add-on device. That is, either eliminating memory from and add-on device or at least substantially reducing the amount of memory on an add-on device reduces the overall cost associated with the add-on device.

In one embodiment, an add-on device has a read-only memory (ROM) basic-input-output-system (BIOS), or an expansion BIOS, that performs initialization processes associated with the add-on device. The ROM BIOS is also arranged to provide a software interface that may be used by an OS of an overall computing system that hosts the add-on device. A system BIOS of the overall computing system may allocate a block in an upper memory area (UMA) and load the ROM BIOS into an upper memory area (UMA) during a power on self test (POST). As will be appreciated by those skilled in the art, the UMA is an area in a system memory that is typically located between approximately 640 kiloBytes (kB) and approximately 1 megaByte (MB). After the ROM BIOS allocates memory to the add-on device, the ROM BIOS may update, or modify, the system memory map as appropriate.

Figure 1:
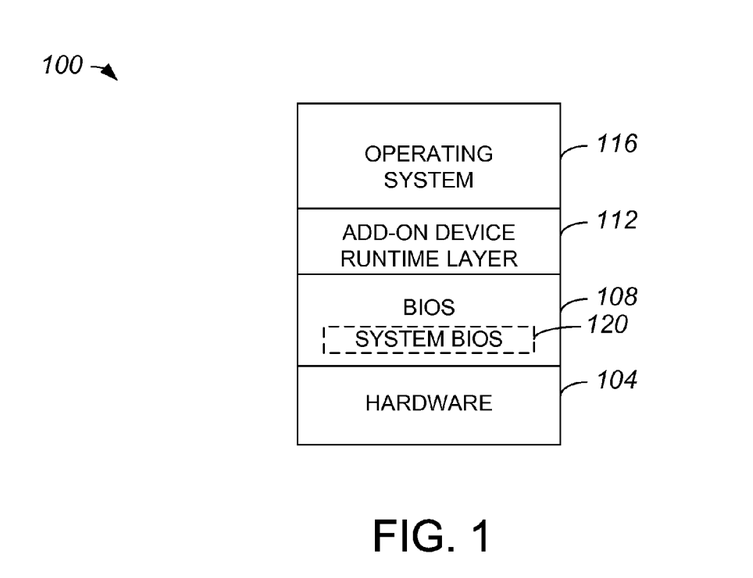
FIG. 1 is a diagrammatic representation of layers associated with a computing system in accordance with an embodiment of the present invention.

The ability for the ROM BIOS of an add-on device to allocate system memory and to modify a corresponding system memory map is effectively provided in a layer within a host system, e.g., a computing device that hosts the add-on device. Referring initially to FIG. 1, the layers associated with a host system will be described in accordance with an embodiment of the present invention. A host system 100 generally includes a hardware layer 104, a BIOS layer 108, and an OS layer 116. In the described embodiment, host system 100 also includes an add-on device runtime layer 112.

Hardware layer 104 generally includes firmware and hardware components, e.g., a central processing unit (CPU). When power is provided to host system 100, as for example when host system 100 is effectively turned on, hardware layer 104 typically gains initial control such that firmware and hardware components may be substantially powered on. Once hardware layer 104 powers on firmware and hardware components, hardware layer 104 passes control to BIOS layer 108, which includes a system BIOS 120.

BIOS layer 108 generally includes firmware which allows hardware such as a CPU, as well as a system memory (not shown), to be substantially initialized. Initializing the system memory (not shown) may include allocating regions or portions of the system memory for the use of various hardware components associated with hardware layer 104. BIOS layer 108 or, more specifically, system BIOS 120 may also create and update a system memory address map which indicates how the system memory (not shown) has been allocated.

In general, system BIOS 120 may be hardware specific, and effectively enables OS layer 116 to be independent of hardware 104. That is, BIOS layer 108 allows substantially any configuration of OS layer 116 to be used with hardware layer 104.

BIOS layer 108 may initialize components associated with hardware layer 104 during a POST. In the course of the POST, BIOS layer 108 may relinquish control to add-on device runtime layer 112, as for example after components associated with hardware layer 104 are initialized. Add-on device runtime layer 112 allows a ROM BIOS of an add-on device to allocate portions of a system memory (not shown), and to modify or adjust the system memory address map to reflect which portions of the system memory have been allocated for the use of the add-on device. Add-on device runtime layer 112 typically returns control to BIOS layer 108 once the ROM BIOS of the add-on device completes its memory allocation and modification of the system memory address map.

BIOS layer 108 may complete a POST when add-on device runtime layer 112 returns control to BIOS layer 108. Once initialization is completed by BIOS layer 108, BIOS layer 108 hands off control to OS layer 116. When BIOS layer 108 hands off control to OS layer 116, OS layer 116 may access the system memory address map to determine which portions of a system memory (not shown) are available for OS layer 116 to allocate for its use.

Figure 2:
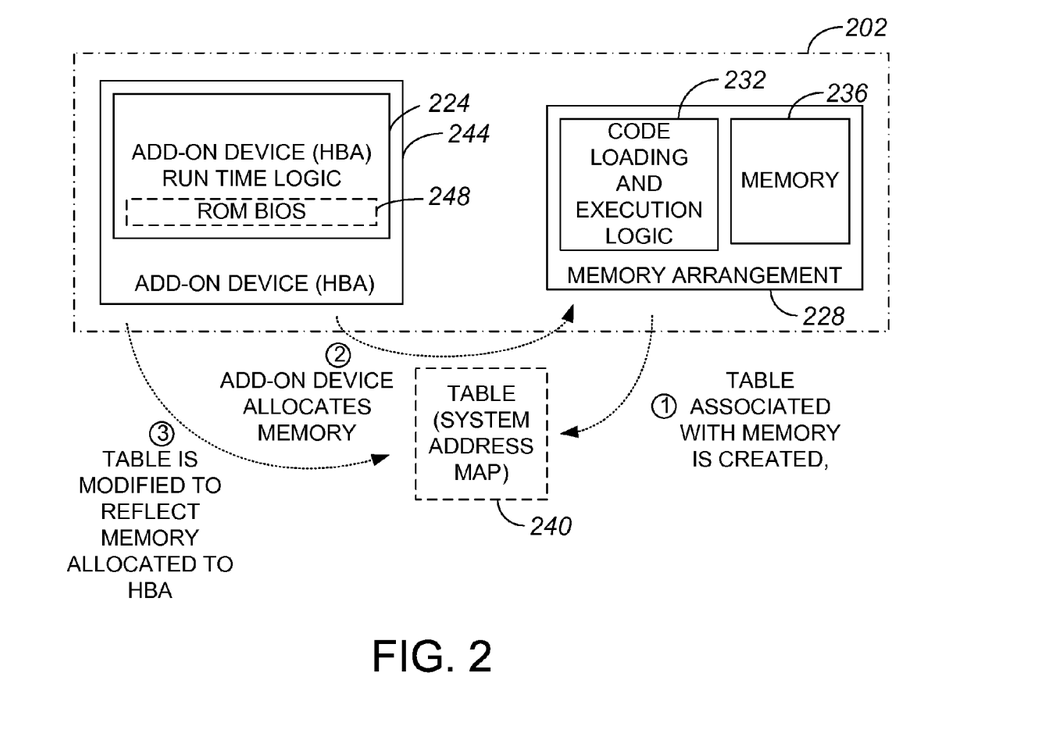
FIG. 2 is a diagrammatic representation of an interaction process between an add-on device, e.g., a host bus adapter, and a host memory arrangement in accordance with an embodiment of the present invention.

With reference to FIG. 2, an interaction process between an add-on device, e.g., a host bus adapter (HBA), and a host memory arrangement will be described in accordance with an embodiment of the present invention. During an interaction process, an HBA 244 may modify a table or a system address map 240 associated with a memory arrangement 228 within an overall computing system 202. Although an HBA 244 is described, it should be understood that add-on device 244 may be substantially any device that may be plugged into overall computing system 202. In one embodiment, overall computing system 202 may be a server system, and HBA 244 may be a PCI card with substantially no allocable on-board memory that is plugged into overall computing system 202. More generally, HBA 244 may be an apparatus which includes insufficient allocable on-board memory to support its needs. HBA 244 has run time logic 224 which includes a ROM BIOS 248. Run time logic 224 generally allows HBA 244 to allocate memory 236 within memory arrangement 228 for its own use. In one embodiment, run time logic 224, which may be embodied as hardware and/or software logic, is arranged to substantially allow HBA 244 to invoke an advanced configuration power management interface (ACPI) INT 15h interface with respect to memory 236 during POST. Run time logic 224 is further arranged to access and to modify table 240.

With respect to an interaction process between HBA 244 and memory arrangement 228, table 240 is created by code loading and execution logic 232 associated with memory arrangement 228. It should be appreciated that table 240 is not generally created specifically for the interaction process, but is used during the interaction process. At some point after table 240 is created, HBA 244 allocates memory space for its own use within memory 236. In other words, HBA 244 effectively reserves a portion of memory 236. After allocating a portion of memory 236, HBA 244 updates or otherwise modifies table 240 to indicate that HBA 244 has allocated space within memory 236.

The contents of table 240 typically change as allocations are made with respect to memory 236 by memory arrangement 228. In the described embodiment, the contents of table 240 also change when HBA 244 updates table 240. Hence, at different times during an overall memory allocation process associated with the allocation of space within memory 236 by HBA 244, the contents of table 240 change as appropriate.

Figure 3A:
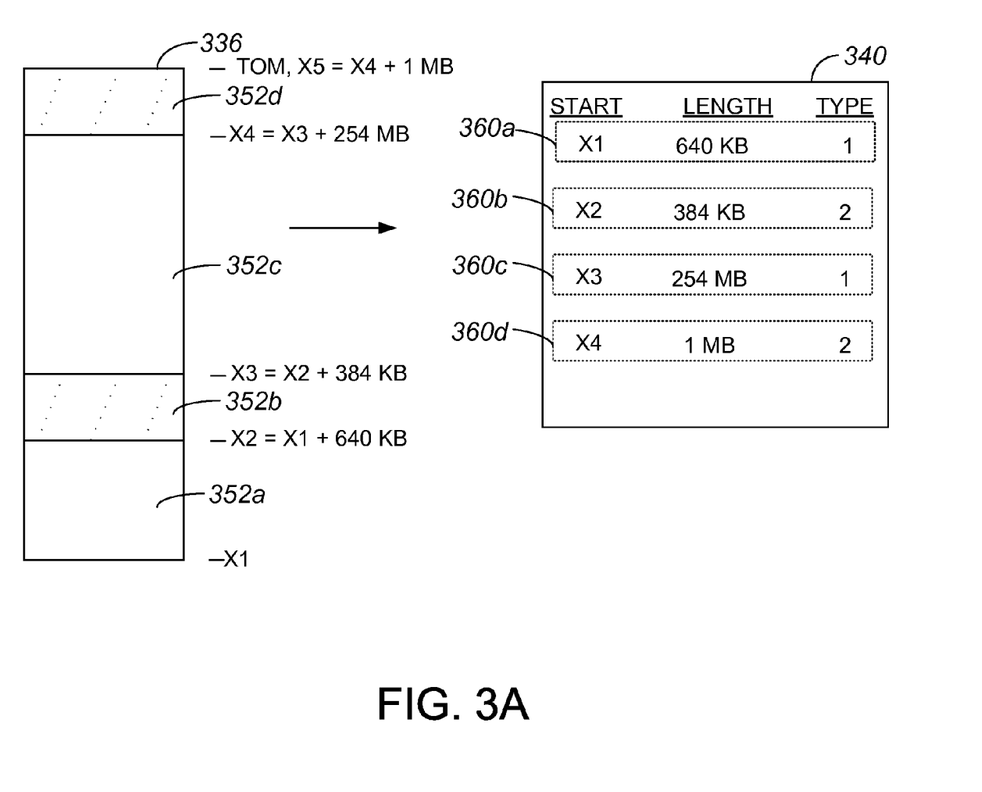
FIG. 3A is a diagrammatic representation of a host memory and a corresponding system address map at a time t1 during an overall memory allocation process in accordance with an embodiment of the present invention.

FIG. 3A is a diagrammatic representation of a host memory and a corresponding system address map or table at a time t1 during an overall memory allocation process in accordance with an embodiment of the present invention. At a time t1, which may the onset of a memory allocation process, space within a memory 336 of an overall computing system is utilized such that various blocks, which includes free blocks and reserved blocks, may be allocated. As shown, a first block 352a which is substantially free begins at X1 and has a size of approximately 640 kilobytes (KB), a second block 352b which is substantially reserved begins at X2 and has a size of approximately 384 KB, a third block 352c which is substantially free begins at base X3 and has a size of approximately 254 megabytes (MB), and a fourth block which is substantially reserved begins at base X4 and has a size of approximately 1 MB. A top 336 of X5 effectively indicates a top of memory (TOM) associated with memory 336

At time t1, a system address map or table 340 includes table entries 360a-d which may effectively be called address range descriptors. Each table entry 360a-d includes, but is not limited to including, an indication of the start of a memory block, a size of the memory block, and a type associated with the memory block. As shown, table entry 360a is associated with first block 352a, and indicates that first block 352a starts at 'X1' in memory 336, has a size corresponding to approximately 640 KB, and a type of '1'. In general, type indicators, or indicators of the state of a block of memory, may vary widely. By way of example, a type indicator of '1' may indicate that an address range is substantially free and a type indicator of '2' may indicate that an address range is reserved. Hence, type '1' in table entry 352a may indicate that an address range beginning at base X1 is substantially available. In general, for each block 352a-d in memory 336, there is a corresponding table entry 360a-d or address range descriptor.

Figure 3B:
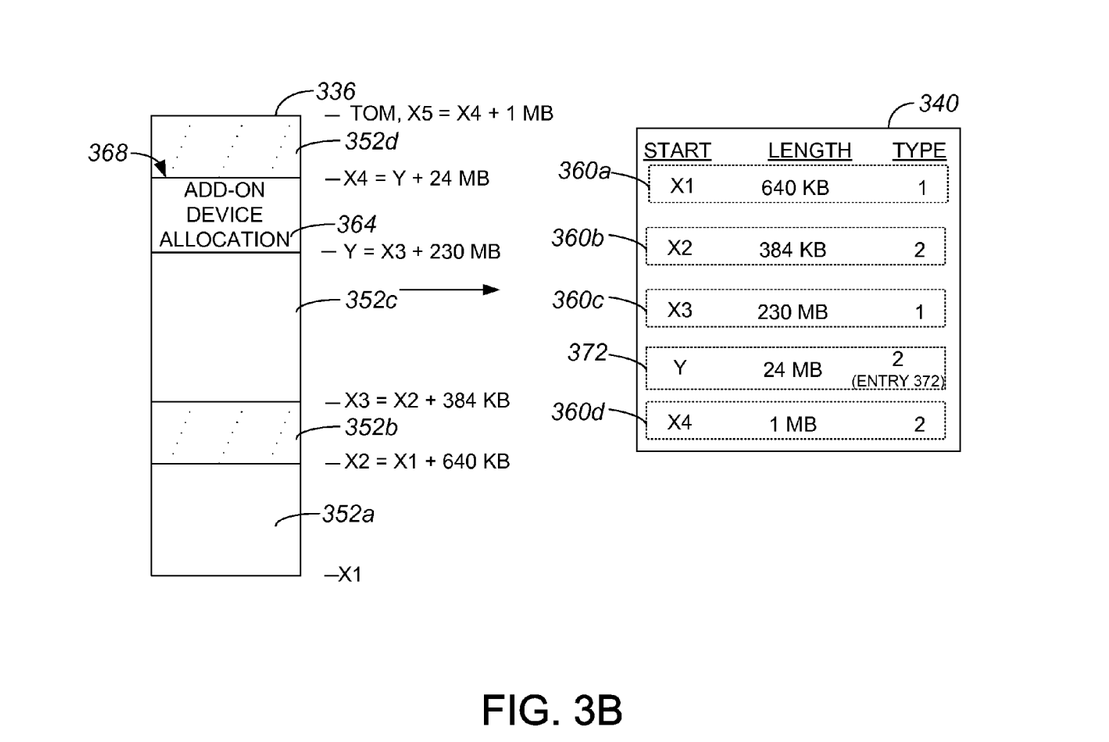
FIG. 3B is a diagrammatic representation of a host memory and a corresponding system address map, e.g., host memory 336 and system address map 340 of FIG. 3A, after an add-on device has allocated memory and modified the system address map in accordance with an embodiment of the present invention.

FIG. 3B is a diagrammatic representation of a host memory and a corresponding system address map, e.g., host memory 336 and system address map 340 of FIG. 3A, at a time t2 after an add-on device has allocated memory and modified the system address map in accordance with an embodiment of the present invention. At a time t2, an add-on device such as an HBA has allocated a block 364 within memory 336 for its own use. More particularly, the add-on device has identified third block 352c as being substantially free, and has allocated a portion of third block 352c, namely a portion corresponding to block 364, for its own use. The allocation associated with block 364, or a block 'Y,' is substantially performed or otherwise done by a ROM BIOS associated with the add-on device. That is, the ROM BIOS of the add-on device allocates block 364 from substantially free block 352c within memory 336 for the use of the add-on device.

The ROM BIOS of the add-on device may, upon allocating block 364 at time t2, update table 340 by adding a table entry 372. Table entry 372 may indicate that a start of block 364 is at a location within memory 336 that corresponds to third block 352c, and that the size of block 364 is approximately 24 MB. Finally, table entry 372 may indicate a type of '2,' which essentially identifies an address range associated with block 364 as being substantially allocated. It should be understood that while the ROM BIOS of the add-on device updates table 340, the add-on device effectively has control of table 340. However, once the ROM BIOS of the add-on device updates table 340, control of table 340 is generally returned to the OS of the overall computing system, i.e., the overall computing system which substantially owns memory 336.

Figure 4:
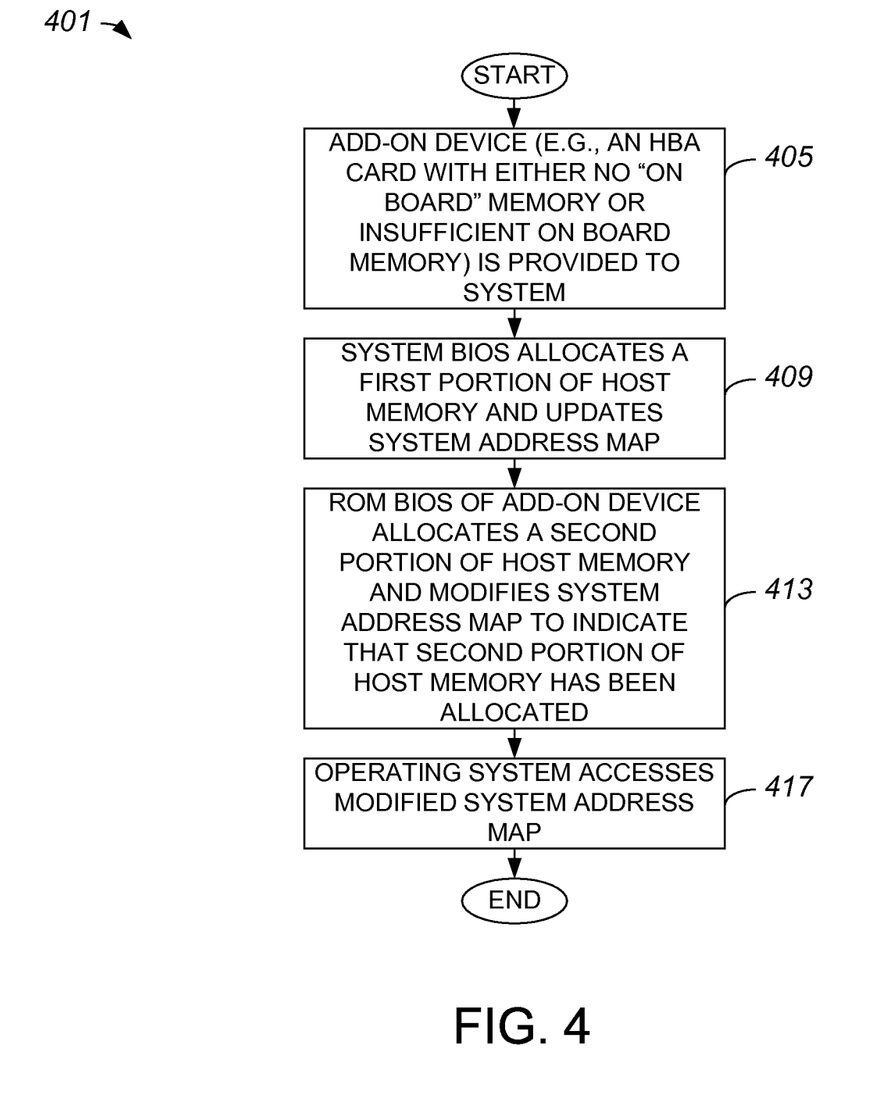
FIG. 4 is a process flow diagram which illustrates one general method of allocating host memory during a power on self test (POST) in accordance with an embodiment of the present invention.

With reference to FIG. 4, a general process of allocating host system memory to an add-on device during a POST will be described in accordance with an embodiment of the present invention. A process 401 of allocating host system memory begins at step 405 in which an add-on device is provided to a host system. Providing the add-on device to the host system may include interfacing the add-on device with the host system, e.g., plugging an add-on device into an expansion slot associated with the host system. In one embodiment, the add-on device is an HBA card that either has no on-board memory or an insufficient amount of on-board memory.

In step 409, a host system BIOS allocates memory in blocks from the host memory for its own usage, and updates a system address map to identify those blocks as being allocated. That is, the host system BIOS reserves memory for use in loading and executing computer codes associated with the host system. After the system bios allocates memory for its own usage, the host system BIOS allows the ROM BIOS of the add-on device to allocate a second portion of the host memory for use by the add-on device, and to modify the system address map, in step 413. The system address map may be modified by the ROM BIOS to indicate that a portion of the available host memory has been allocated for its own usage.

From step 413, process flow moves to step 417 in which the OS access the modified system address map, i.e., the system address map as modified by the ROM BIOS. In general, the host system BIOS may implement an ACPI that allows the system memory map to be communicated to the OS. Once the operating system accesses the modified system address map, the process of allocating host memory is completed.

Figure 5:
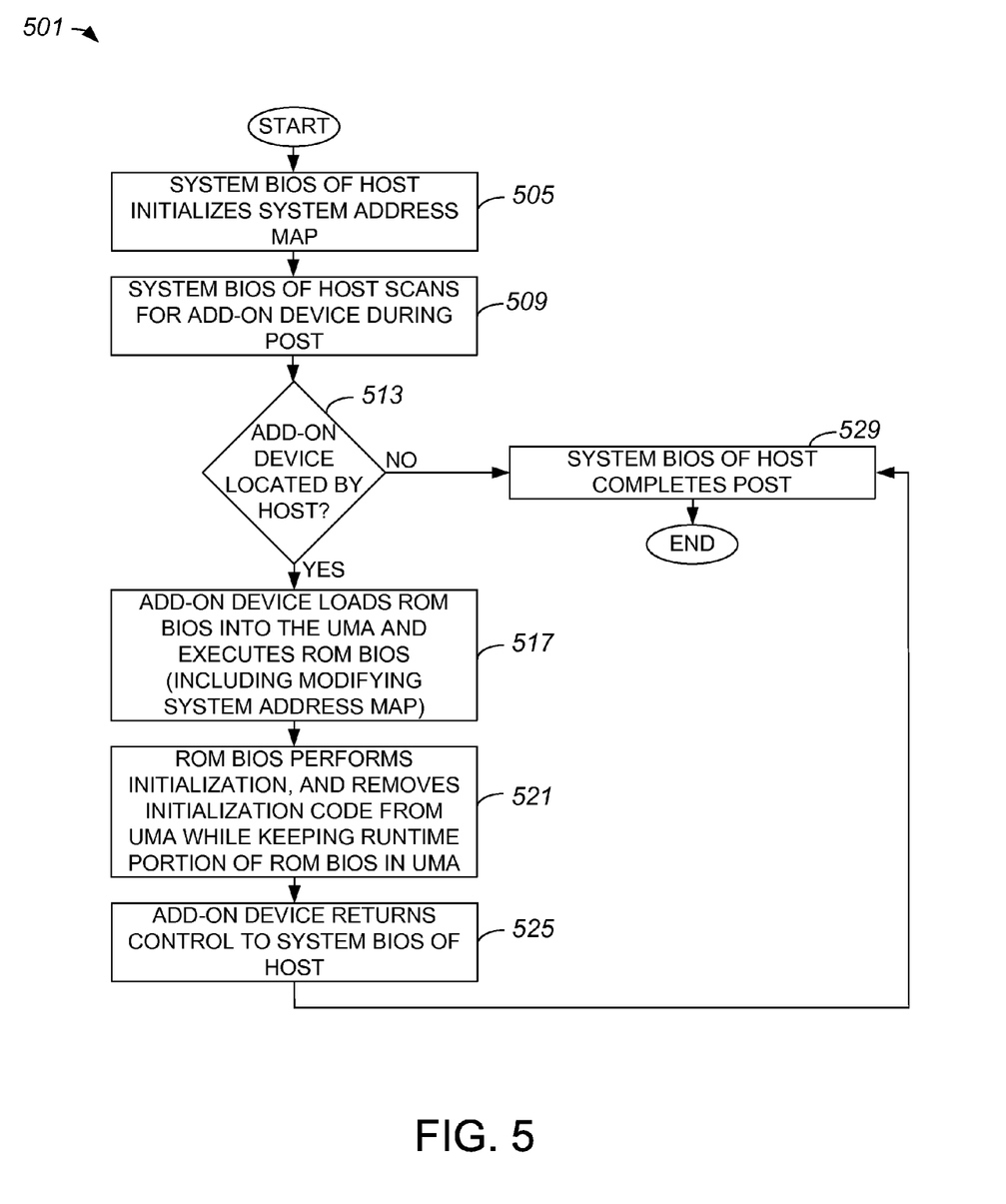
FIG. 5 is a process flow diagram which illustrates one specific method of allocating host memory during a POST in accordance with an embodiment of the present invention.

Referring next to FIG. 5, an overall POST process that includes allocating host system memory for use by an add-on device will be described in more detail in accordance with an embodiment of the present invention. A process 501 of effectively executing a POST begins at step 505 in which a system BIOS of a host system initializes a system address map. It should be appreciated that the system address map is initialized during the POST. Although the configuration of a system address map may vary widely, the system address map may be a data structure which is arranged to list a start point for each allocated memory portion, a size of each allocated memory portion, and the availability associated with each allocated memory portion.

Once the system address map is initialized, the system BIOS of the host system scans for an add-on device in step 509. A determination is then made in step 513 as to whether an add-on device has been located or otherwise identified by the host system. If it is determined that no add-on device has been located by the host system, process flow proceeds to step 529 in which the system BIOS completes the POST, and the process of effectively executing a POST is completed.

Alternatively, if it is determined in step 513 that an add-on device has been located by the host system, the indication is that the add-on device will reserve memory associated with the host system. It should be understood that an add-on device may not need to utilize memory associated with the host system. However, for ease of discussion, the add-on device of the present invention is arranged to reserve memory associated with the host system.

If an add-on device has been located by the host system, process flow proceeds to step 517 in which the add-on device loads its associated ROM BIOS into the UMA of the host system, and executes the ROM BIOS. Executing the ROM BIOS includes modifying the system address map. One method of executing a ROM BIOS will be discussed below with respect to FIG. 5.

In step 521, the ROM BIOS performs initialization, and removes the initialization code from the UMA, while substantially keeping a runtime portion of the ROM BIOS in the UMA. It should be appreciated that during initialization, the ROM BIOS typically configures internal hardware components, detects attached devices, and installs the runtime portion of the ROM BIOS in the UMA. After initialization is performed, the add-on device returns control to the system BIOS of the host system in step 525. Then, in step 529, the system BIOS completes the POST.

Figure 6:
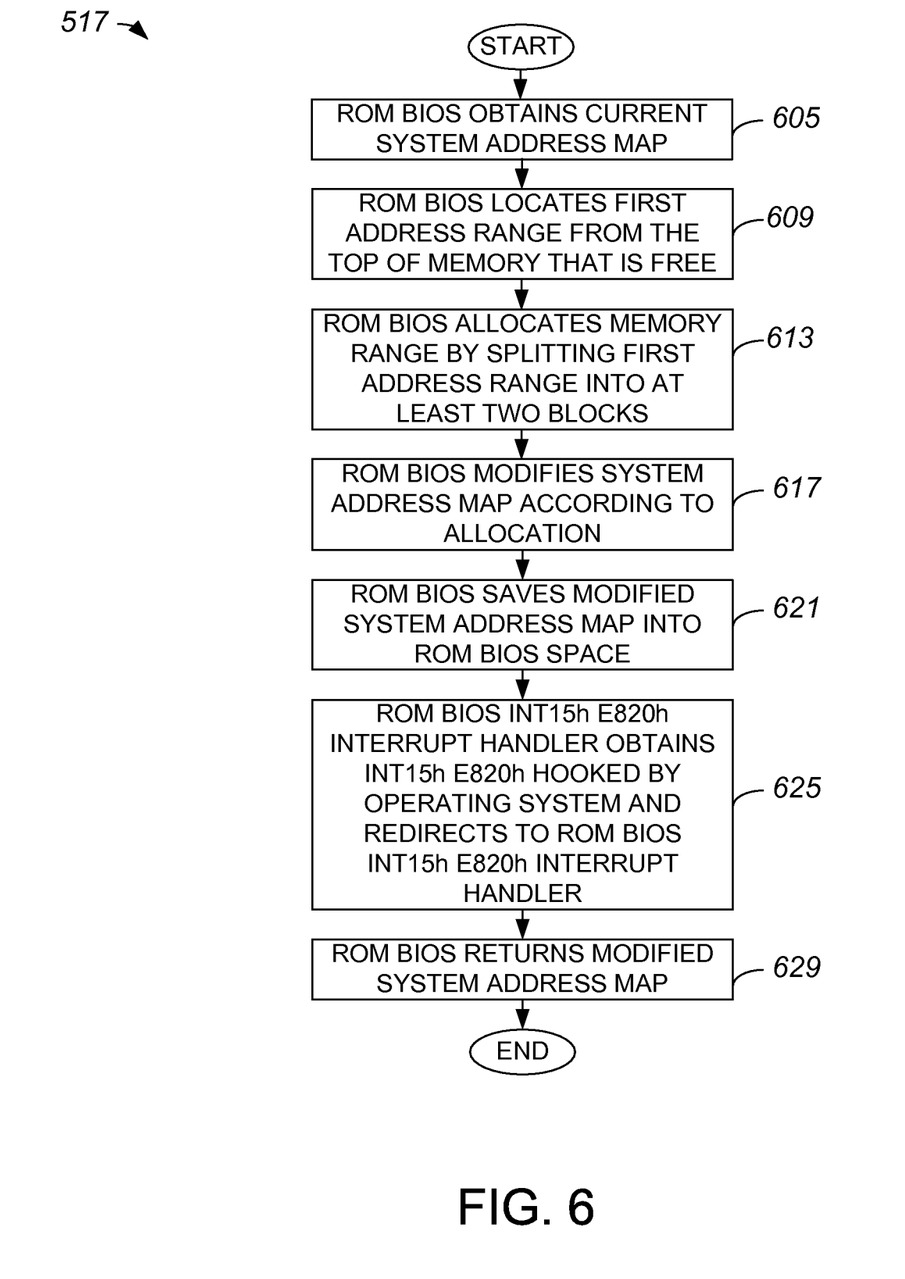
FIG. 6 is a process flow diagram which illustrates one method of executing a ROM bios associated with an add-on device, e.g., step 517 of FIG. 5, in accordance with an embodiment of the present invention.

FIG. 6 illustrates one method of executing a ROM BIOS associated with an add-on device, e.g., step 517 of FIG. 5, in accordance with an embodiment of the present invention. A process 517 of executing a ROM BIOS begins at step 605 in which the ROM BIOS obtains a current system address map, i.e., the system address map associated with the system memory within which the ROM BIOS is arranged to allocate memory. In one embodiment, the current system address map is obtained by querying a system address map interface. Querying the system address map interface generally results in a set of address range descriptors, as specified by an ACPI specification, being returned. Each address range descriptor may include an address range and a type, as discussed above with respect to FIGS. 3A and 3B.

After the ROM BIOS obtains the current system address map, the ROM BIOS locates the first address range from the top of memory that is free or otherwise available in step 609. By way of example, the first address range from the top of memory that has a type value of one may be located. Then, in step 613, the ROM BIOS allocates a memory range by splitting the first address range into at least two blocks. The first address range may be split such that a higher block corresponds to the address range needed by the add-on device, while the lower block corresponds to the rest of the memory range. Such a higher block may have a type value set to indicate that the address range associated with the higher block is reserved, while the lower block may have a type value set to indicate that its address range is substantially free.

Once the ROM BIOS splits the first address range, the ROM BIOS modifies the address system map in step 617 according to the allocation. The ROM BIOS typically modifies or adjusts the system address map to effectively reflect that the higher block and the lower block have been allocated or otherwise specified. In step 621, the ROM BIOS saves the modified system address map into a ROM BIOS space.

From step 621, process flow moves to step 625 in which a ROM BIOS hooks an interrupt handler, e.g., an INT15h E820h interrupt handler, so that it may obtains control whenever the OS, or any other entity, invokes the INT15h E820h interrupt handler in order to obtain the system address map. The ROM BIOS typically returns the updated or modified system address map whenever it obtains control through an INT15h E820h call. After the ROM BIOS returns the modified system address map in step 629, the process of executing a ROM BIOS is completed.

Although only a few embodiments of the present invention have been described, it should be understood that the present invention may be embodied in many other specific forms without departing from the spirit or the scope of the present invention. By way of example, although an add-on device has been described as being an HBA card, an add-on device may be substantially any module which utilizes system memory. For instance, the add-on device may be a host channel adapter (HCA) such as the Infiniband HCA available commercially from Cisco Systems, Inc. of San Jose, Calif. An add-on device may also be SCSI card module, a video card module, or an audio card module.

Further, while an add-on device has been described as including substantially no on-board memory, an add-on device may either include no on-board memory or may include at least some on-board memory. In other words, an add-on device is not limited to including only those devices with no on-board memory. For instance, an add-on device which includes insufficient on-board memory to support its memory requirements may allocate a block in system memory as discussed above. It should be appreciated that in some instances, an add-on device which includes insufficient on-board memory to support its memory requirements may be considered to be an add-on device with effectively no insufficient on-board memory.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method comprising:
   determining when a host memory arrangement updates a system address map, the host memory arrangement including a system memory, wherein the system address map is associated with the system memory;
   obtaining control from a system basic-input-output-system (BIOS) associated with an operating system (OS) of the host memory arrangement when it is determined that the host memory arrangement updated the system address map;
   allocating a first memory block in the system memory using an add-on device after obtaining control from the host memory arrangement, the add-on device being interfaced with the host memory arrangement, wherein the add-on device has a first read-only memory (ROM) BIOS, and wherein allocating the first memory block in the system memory using the add-on device includes reserving the first memory block for use by the add-on device, the first memory block being reserved by the first ROM BIOS;
   updating the system address map to indicate that the first memory block has been allocated to the add-on device, the system address map being updated by using the add-on device, wherein updating the system address map to indicate that the first memory block has been allocated by using the add-on device includes updating the system address map using first the ROM BIOS; and
   returning the control to the system BIOS after updating the system address map by using the add-on device to indicate that the first memory block has been allocated to the add-on device.

2. The method of claim 1 wherein updating the system address map to indicate that the first memory block has been allocated to the add-on device includes obtaining the system address map, modifying the system address map according to an allocation associated with the first memory block, and saving the system address map in a ROM BIOS space associated with the first ROM BIOS.

3. The method of claim 2 further including:
   hooking a INT15h E820h to obtain control from the OS using a INT15h E820h interrupt handler of the first ROM BIOS; and
   redirecting a call to the INT15h E820h from the OS to the INT15h E820h interrupt handler of the first ROM BIOS.

4. The method of claim 1 wherein allocating the first memory block in the system memory includes locating a first address range from a top of the system memory that is free.

5. The method of claim 1 wherein the add-on device is one selected from the group including a host bus adapter (HBA), a host channel adapter (HCA), a SCSI card, a video card, and an audio card.

6. The method of claim 1 wherein the add-on device is a host bus adapter (HBA), and wherein the method further includes interfacing the add-on device with the host memory arrangement.

7. The method of claim 1 further including:
   returning the updated system address map to the OS whenever the OS accesses the system address map.

8. Logic encoded in one or more non-transitory tangible media for execution and when executed operable to:
   determine when a host memory arrangement updates a system address map, the host memory arrangement including a system memory, wherein the system address map is associated with the system memory;
   obtain control from a system basic-input-output-system (BIOS) associated with an operating system (OS) of the host memory arrangement when it is determined that the host memory arrangement updated the system address map;
   allocate a first memory block in the system memory using an add-on device after obtaining control from the host memory arrangement, the add-on device being interfaced with the host memory arrangement, wherein the add-on device has a first read-only memory (ROM) BIOS, and wherein the logic operable to allocate the first memory block in the system memory using the add-on device is further operable to reserve the first memory block for use by the add-on device, the first memory block being reserved by the first ROM BIOS;
   update the system address map to indicate that the first memory block has been allocated to the add-on device, the system address map being updated by using the add-on device, wherein the logic operable to update the system address map to indicate that the first memory block has been allocated by using the add-on device is further operable to update the system address map using the first ROM BIOS; and
   return the control to the system BIOS after updating the system address map by using the add-on device to indicate that the first memory block has been allocated to the add-on device.

9. The logic of claim 8 wherein the logic operable to update the system address map to indicate that the first memory block has been allocated to the add-on device is further operable to obtain the system address map, modify the system address map according to an allocation associated with the first memory block, and save the system address map in a ROM BIOS space associated with the first ROM BIOS.

10. The logic of claim 9 further operable to:
hook a INT15h E820h to obtain control from the OS using a INT15h E820h interrupt handler of the first ROM BIOS; and
redirect a call to the INT15h E820h from the OS to the INT15h E820h interrupt handler of the first ROM BIOS.

11. The logic of claim 8 wherein the logic operable to allocate the first memory block in the system memory is further operable to locate a first address range from a top of the system memory that is free.

12. The logic of claim 8 wherein the add-on device is one selected from the group including a host bus adapter (HBA) and a host channel adapter (HCA).

13. An apparatus comprising:
means for determining when a host memory arrangement updates a system address map, the host memory arrangement including a system memory, wherein the system address map is associated with the system memory;
means for obtaining control from a system basic-input-output-system (BIOS) associated with an operating system (OS) of the host memory arrangement when it is determined that the host memory arrangement updated the system address map;
means for allocating a first memory block in the system memory using an add-on device after obtaining control from the host memory arrangement, the add-on device being interfaced with the host memory arrangement, wherein the add-on device has a first read-only memory (ROM) BIOS, and wherein the means for allocating the first memory block in the system memory using the add-on device include means for reserving the first memory block for use by the add-on device, the first memory block being reserved by the first ROM BIOS;
means for updating the system address map to indicate that the first memory block has been allocated to the add-on device, the system address map being updated by the add-on device, wherein the means for updating the system address map to indicate that the first memory block has been allocated by using the add-on device include means for updating the system address map using the first ROM BIOS; and
means for returning the control to the system BIOS after updating the system address map to indicate that the first memory block has been allocated to the add-on device.

14. An add-on device comprising:
a read-only memory (ROM) basic-input-output-system (BIOS);
logic that causes a first block to be allocated in a memory for use by the add-on device, the memory being a host memory associated with a host system in communication with the add-on device, the logic that causes the first block to be allocated in the memory for use by the add-on device being encoded in a non-transitory tangible media; and
logic that causes an address map associated with the memory to be updated to identify the first block as being allocated to the add-on device, the logic that causes the address map associated with the memory to be updated being encoded in a non-transitory tangible media, wherein the logic that causes the address map associated with the memory to be updated is associated with the ROM BIOS and is arranged to allow the ROM BIOS to update the address map.

15. The add-on device of claim 14 wherein the logic that causes an address map associated with the memory to be updated is further arranged to load the ROM BIOS of the add-on device into an upper memory area (UMA) associated with the host system.

16. The add-on device of claim 15 wherein the ROM BIOS is arranged to save the address map such that an operating system (OS) of the host system may access the address map.

17. A method comprising:
determining when a host memory arrangement initializes a system address map, the host memory arrangement including a system memory, wherein the system address map is associated with the system memory;
obtaining control from a system basic-input-output-system (BIOS) associated with an operating system (OS) of the host memory arrangement when it is determined that the host memory arrangement initializes the system address map, wherein obtaining control from the system BIOS associated with the OS of the host memory arrangement includes loading a first read-only memory (ROM) BIOS of an add-on device into the host, the add-on device being interfaced with the host memory arrangement;
reserving a first memory block in the system memory using the first ROM BIOS after obtaining control from the system BIOS associated with the OS of the host memory arrangement, wherein reserving the first memory block in the system memory includes reserving the first memory block for use by the add-on device;
updating the system address map using the first ROM BIOS to indicate that the first memory block has been reserved for use by the add-on device, the system address map being updated by using the add-on device; and
returning the control to the system BIOS associated with the OS after updating the system address map using the first ROM BIOS to indicate that the first memory block has been reserved for use by the add-on device.

* * * * *